US012689417B2

(12) United States Patent
    Berger et al.

(10) Patent No.:     US 12,689,417 B2
(45) Date of Patent:          Jul. 21, 2026

(54) POLAR MULTI-LAYER CODING MULTIPLE INPUT MULTIPLE OUTPUT SCHEME

(71) Applicant: QUALCOMM Incorporated, San Diego, CA (US)

(72) Inventors: Peer Berger, Hod Hasharon (IL); Shay Landis, Hod Hasharon (IL); Jacob Pick, Mevaseret Zion (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/669,301

(22) Filed: May 20, 2024

(65) Prior Publication Data

US 2025/0357975 A1      Nov. 20, 2025

(51) Int. Cl.
*H04B 7/10*          (2017.01)
*H04B 7/0456*        (2017.01)

(52) U.S. Cl.
CPC ............. *H04B 7/0473* (2013.01); *H04B 7/10* (2013.01)

(58) Field of Classification Search
CPC ..... H04B 7/0473; H04B 7/10; H03M 13/611; H03M 13/13; H04L 1/0057
See application file for complete search history.

(56) References Cited

U.S. PATENT DOCUMENTS

2018/0331783 A1* 11/2018 Ahn ........................ H04L 27/18
2019/0200348 A1   6/2019 Chae et al.

2019/0393986 A1* 12/2019 Wang .................... H04L 1/0046
2020/0099471 A1*  3/2020 Ye ....................... H03M 13/6306
2020/0228147 A1*  7/2020 Ye ........................ H03M 13/635
2023/0370190 A1* 11/2023 Bae ........................ H04L 1/0026
2024/0008023 A1*  1/2024 Yoon ................. H04W 72/0446
2024/0267171 A1*  8/2024 Patchava ............... H04L 5/0094

FOREIGN PATENT DOCUMENTS

WO      WO-2022188710 A1 *  9/2022   .......... H04L 1/0057
WO      WO-2024130113 A1 *  6/2024   .......... H04L 1/1819

OTHER PUBLICATIONS

Dai J., et al., "Polar Coded MIMO Systems", IEEE Transactions on Vehicular Technology, vol. 67, No. 7, Jul. 2018, pp. 6170-6184.

(Continued)

*Primary Examiner* — Aristocratis Fotakis
(74) *Attorney, Agent, or Firm* — Holland & Hart LLP/QUALCOMM Incorporated

(57)          ABSTRACT

Methods, systems, and devices for wireless communications are described. A user equipment (UE) may transmit an indication of a capability of the UE to communicate in accordance with a polar multi-layer coding (MLC) multiple input multiple output (MIMO) communication scheme. The UE may receive a configuration for communication in accordance with the polar MLC MIMO communication scheme, wherein the configuration indicates a sub-block size threshold. The UE may communicate a message in accordance with the polar MLC MIMO communication scheme based at least in part on a determination that a sub-block size for the message satisfies the sub-block size threshold.

26 Claims, 14 Drawing Sheets

(56)     References Cited

OTHER PUBLICATIONS

Chae S H., et al., "Multilevel Coding Scheme for Integer-Forcing MIMO Receivers With Binary Codes", IEEE Transactions on Wireless Communications, vol. 16, No. 8, Aug. 1, 2017, IEEE Service Center, Piscataway, NJ, US, pp. 5428-5441, XP011658713, the whole document.

International Search Report and Written Opinion—PCT/US2025/026238—ISA/EPO—Jul. 29, 2025 (2401958WO).

Zheng M., et al., "Polar Coding for Noncoherent Block Fading Channels", 2018th International Conference on Wireless Communications and Signal Processing (WCSP), IEEE, Oct. 18, 2018, 5 pages, XP033460213, p. 1, right-hand column, paragraph 1.

Arikan, "Channel polarization: A method for constructing capacity-achieving codes for symmetric binary-input memoryless channels", IEEE Transactions on Information Theory, arXiv:0807.3917v5 [cs.IT], Jul. 2009, URL: https://arxiv.org/abs/0807.3917v5, 23 pages.

\* cited by examiner 130    105    115

Network
Entity

Transceiver                    Antenna 1210                           1215

Communications
Manager

Memory

Code

1230

1220                           1225

1240

Processor

1235

1205

1200

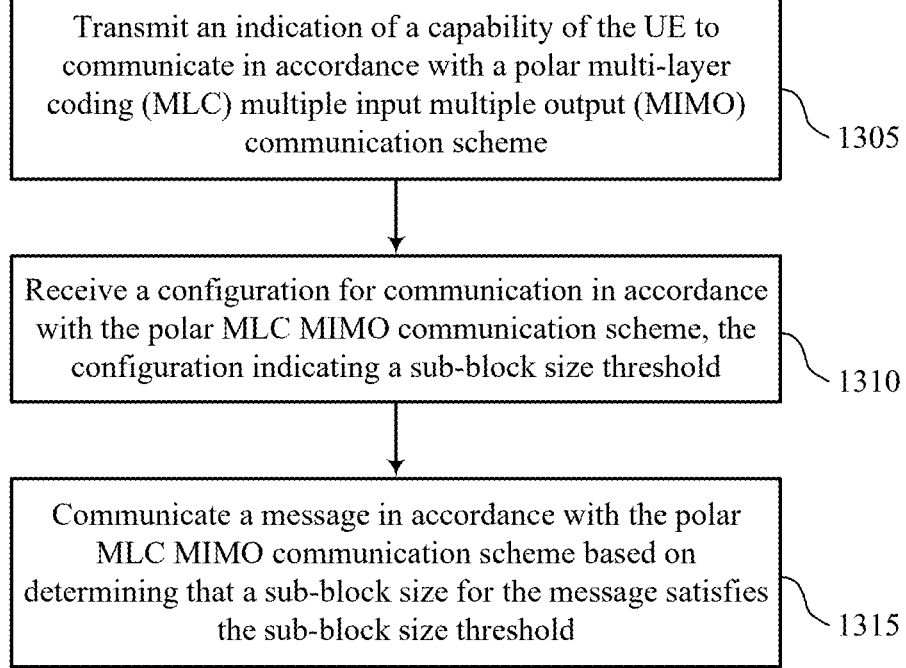

Transmit an indication of a capability of the UE to communicate in accordance with a polar multi-layer coding (MLC) multiple input multiple output (MIMO) communication scheme — 1305

Receive a configuration for communication in accordance with the polar MLC MIMO communication scheme, the configuration indicating a sub-block size threshold — 1310

Communicate a message in accordance with the polar MLC MIMO communication scheme based on determining that a sub-block size for the message satisfies the sub-block size threshold — 1315

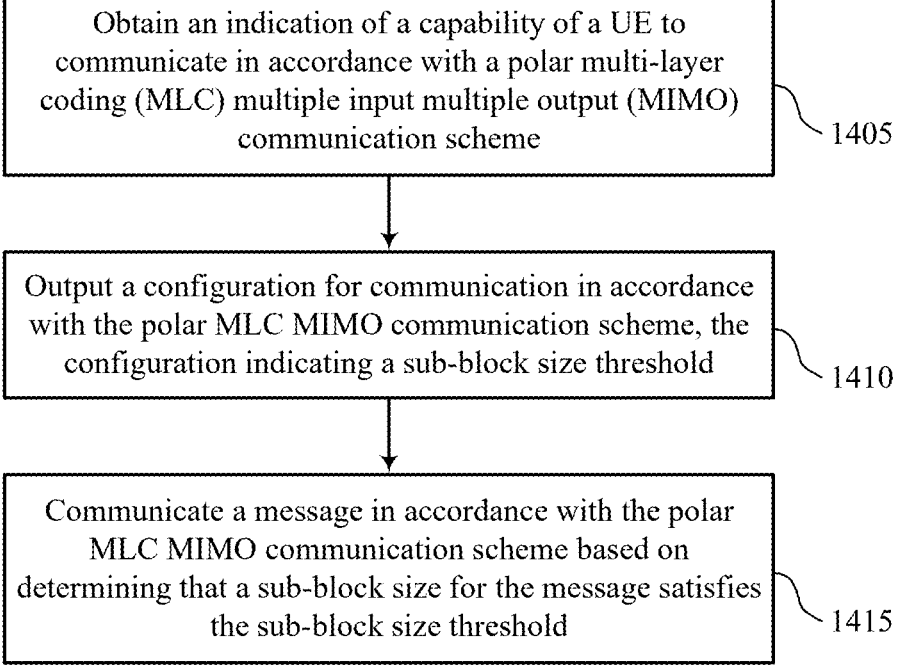

Obtain an indication of a capability of a UE to communicate in accordance with a polar multi-layer coding (MLC) multiple input multiple output (MIMO) communication scheme ⟍ 1405

Output a configuration for communication in accordance with the polar MLC MIMO communication scheme, the configuration indicating a sub-block size threshold ⟍ 1410

Communicate a message in accordance with the polar MLC MIMO communication scheme based on determining that a sub-block size for the message satisfies the sub-block size threshold ⟍ 1415

POLAR MULTI-LAYER CODING MULTIPLE INPUT MULTIPLE OUTPUT SCHEME

INTRODUCTION

The following relates to wireless communications, including implementation and associated signaling for high-capacity communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a wireless device may communicate in a multiple input multiple output (MIMO) communications scenario.

SUMMARY

The systems, methods, and devices of this disclosure each have several innovative aspects, no single one of which is solely responsible for the desirable attributes disclosed herein.

A method for wireless communications by a user equipment (UE) is described. The method may include transmitting an indication of a capability of the UE to communicate in accordance with a polar multi-layer coding (MLC) multiple input multiple output (MIMO) communication scheme, receiving a configuration for communication in accordance with the polar MLC MIMO communication scheme, wherein the configuration indicates a sub-block size threshold, and communicating a message in accordance with the polar MLC MIMO communication scheme based on a determination that a sub-block size for the message satisfies the sub-block size threshold.

A UE for wireless communications is described. The UE may include one or more memories storing processor executable code, and one or more processors coupled with the one or more memories. The one or more processors may individually or collectively be operable to execute the code to cause the UE to transmit an indication of a capability of the UE to communicate in accordance with a polar multi-layer coding (MLC) multiple input multiple output (MIMO) communication scheme, receive a configuration for communication in accordance with the polar MLC MIMO communication scheme, wherein the configuration indicates a sub-block size threshold, and communicate a message in accordance with the polar MLC MIMO communication scheme based on a determination that a sub-block size for the message satisfies the sub-block size threshold.

Another UE for wireless communications is described. The UE may include means for transmitting an indication of a capability of the UE to communicate in accordance with a polar multi-layer coding (MLC) multiple input multiple output (MIMO) communication scheme, means for receiving a configuration for communication in accordance with the polar MLC MIMO communication scheme, wherein the configuration indicates a sub-block size threshold, and means for communicating a message in accordance with the polar MLC MIMO communication scheme based on a determination that a sub-block size for the message satisfies the sub-block size threshold.

An apparatus for wireless communications at a user equipment (UE) is described. The apparatus may include one or more memories and one or more processors coupled with the one or more memories and configured to cause the UE to transmit an indication of a capability of the UE to communicate in accordance with a polar multi-layer coding (MLC) multiple input multiple output (MIMO) communication scheme, receive a configuration for communication in accordance with the polar MLC MIMO communication scheme, wherein the configuration indicates a sub-block size threshold; and communicate a message in accordance with the polar MLC MIMO communication scheme based at least in part on determining a determination that a sub-block size for the message satisfies the sub-block size threshold.

Another apparatus for wireless communications at a UE is described. The apparatus may include means for transmitting an indication of a capability of the UE to communicate in accordance with a polar multi-layer coding (MLC) multiple input multiple output (MIMO) communication scheme, means for receiving a configuration for communication in accordance with the polar MLC MIMO communication scheme, wherein the configuration indicates a sub-block size threshold, and means for communicating a message in accordance with the polar MLC MIMO communication scheme based on a determination that a sub-block size for the message satisfies the sub-block size threshold.

A non-transitory computer-readable medium storing code for wireless communications is described. The code may include instructions executable by one or more processors to transmit an indication of a capability of the UE to communicate in accordance with a polar multi-layer coding (MLC) multiple input multiple output (MIMO) communication scheme, receive a configuration for communication in accordance with the polar MLC MIMO communication scheme, wherein the configuration indicates a sub-block size threshold, and communicate a message in accordance with the polar MLC MIMO communication scheme based on a determination that a sub-block size for the message satisfies the sub-block size threshold.

In some examples of the method, user equipment (UEs), and non-transitory computer-readable medium described herein, the sub-block size for the message may be based on a code block length associated with the message, a quantity of communication layers associated with the message, a quantity of modulation bits associated with the message, a coding rate associated with the message, or any combination thereof.

In some examples of the method, user equipment (UEs), and non-transitory computer-readable medium described herein, the indication of the capability of the UE to communicate in accordance with the polar MLC MIMO communication scheme includes a sub-block size capability, where the sub-block size threshold may be based on the sub-block size capability.

In some examples of the method, user equipment (UEs), and non-transitory computer-readable medium described herein, the configuration indicates a first configuration of a set of multiple valid configurations for the polar MLC MIMO communication scheme and respective sub-block sizes of the set of multiple valid configurations each satisfy the sub-block size threshold.

In some examples of the method, user equipment (UEs), and non-transitory computer-readable medium described herein, the configuration indicates a quantity of layers associated with the polar MLC MIMO communication scheme, a modulation and coding scheme, or any combination thereof.

In some examples of the method, user equipment (UEs), and non-transitory computer-readable medium described herein, the sub-block size may be less than the sub-block size threshold.

In some examples of the method, user equipment (UEs), and non-transitory computer-readable medium described herein, the polar MLC MIMO communication scheme includes application of a set of multiple polar codes to sub-blocks of the message, where bit indices of respective polar codes of the set of multiple polar codes may be associated with different combinations of bit positions associated with a modulation order and layers of a set of multiple communication layers of the polar MLC MIMO communication scheme.

In some examples of the method, user equipment (UEs), and non-transitory computer-readable medium described herein, the capability of the UE may be associated with a UE category to which the UE belongs.

In some examples of the method, user equipment (UEs), and non-transitory computer-readable medium described herein, the polar MLC MIMO communication scheme includes constellation-level MLC or layer-level MLC.

A method for wireless communications by a network entity is described. The method may include obtaining an indication of a capability of a UE to communicate in accordance with a polar multi-layer coding (MLC) multiple input multiple output (MIMO) communication scheme, outputting a configuration for communication in accordance with the polar MLC MIMO communication scheme, wherein the configuration indicates a sub-block size threshold, and communicating a message in accordance with the polar MLC MIMO communication scheme based on a determination that a sub-block size for the message satisfies the sub-block size threshold.

A network entity for wireless communications is described. The network entity may include one or more memories storing processor executable code, and one or more processors coupled with the one or more memories. The one or more processors may individually or collectively be operable to execute the code to cause the network entity to obtain an indication of a capability of a UE to communicate in accordance with a polar multi-layer coding (MLC) multiple input multiple output (MIMO) communication scheme, output a configuration for communication in accordance with the polar MLC MIMO communication scheme, wherein the configuration indicates a sub-block size threshold, and communicate a message in accordance with the polar MLC MIMO communication scheme based on a determination that a sub-block size for the message satisfies the sub-block size threshold.

Another network entity for wireless communications is described. The network entity may include means for obtaining an indication of a capability of a UE to communicate in accordance with a polar multi-layer coding (MLC) multiple input multiple output (MIMO) communication scheme, means for outputting a configuration for communication in accordance with the polar MLC MIMO communication scheme, wherein the configuration indicates a sub-block size threshold, and means for communicating a message in accordance with the polar MLC MIMO communication scheme based on a determination that a sub-block size for the message satisfies the sub-block size threshold.

An apparatus for wireless communications at a network entity is described. The apparatus may include one or more memories and one or more processors coupled with the one or more memories and configured to cause the network entity to obtain an indication of a capability of a UE to communicate in accordance with a polar multi-layer coding (MLC) multiple input multiple output (MIMO) communication scheme, output a configuration for communication in accordance with the polar MLC MIMO communication scheme, wherein the configuration indicates a sub-block size threshold, and communicate a message in accordance with the polar MLC MIMO communication scheme based on a determination that a sub-block size for the message satisfies the sub-block size threshold.

Another apparatus for wireless communications at a network entity is described. The apparatus may include means for obtaining an indication of a capability of a UE to communicate in accordance with a polar multi-layer coding (MLC) multiple input multiple output (MIMO) communication scheme, means for outputting a configuration for communication in accordance with the polar MLC MIMO communication scheme, wherein the configuration indicates a sub-block size threshold, and means for communicating a message in accordance with the polar MLC MIMO communication scheme based on a determination that a sub-block size for the message satisfies the sub-block size threshold.

A non-transitory computer-readable medium storing code for wireless communications is described. The code may include instructions executable by one or more processors to obtain an indication of a capability of a UE to communicate in accordance with a polar multi-layer coding (MLC) multiple input multiple output (MIMO) communication scheme, output a configuration for communication in accordance with the polar MLC MIMO communication scheme, wherein the configuration indicates a sub-block size threshold, and communicate a message in accordance with the polar MLC MIMO communication scheme based on a determination that a sub-block size for the message satisfies the sub-block size threshold.

In some examples of the method, network entities, and non-transitory computer-readable medium described herein, the sub-block size for the message may be based on a code block length associated with the message, a quantity of communication layers associated with the message, a quantity of modulation bits associated with the message, a coding rate associated with the message, or any combination thereof.

In some examples of the method, network entities, and non-transitory computer-readable medium described herein, the indication of the capability of the UE to communicate in accordance with the polar MLC MIMO communication scheme includes a sub-block size capability, where the sub-block size threshold may be based on the sub-block size capability.

In some examples of the method, network entities, and non-transitory computer-readable medium described herein, the configuration indicates a first configuration of a set of multiple valid configurations for the polar MLC MIMO communication scheme and respective sub-block sizes of the set of multiple valid configurations each satisfy the sub-block size threshold.

In some examples of the method, network entities, and non-transitory computer-readable medium described herein, the configuration indicates a quantity of layers associated with the polar MLC MIMO communication scheme, a modulation and coding scheme, or any combination thereof.

In some examples of the method, network entities, and non-transitory computer-readable medium described herein, the sub-block size may be less than the sub-block size threshold.

In some examples of the method, network entities, and non-transitory computer-readable medium described herein, the polar MLC MIMO communication scheme includes application of a set of multiple polar codes to sub-blocks of the message, where bit indices of respective polar codes of the set of multiple polar codes may be associated with different combinations of bit positions associated with a modulation order and layers of a set of multiple communication layers of the polar MLC MIMO communication scheme.

In some examples of the method, network entities, and non-transitory computer-readable medium described herein, the capability of the UE may be associated with a UE category to which the UE belongs.

In some examples of the method, network entities, and non-transitory computer-readable medium described herein, the polar MLC MIMO communication scheme includes constellation-level MLC or layer-level MLC.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 13 and 14 show flowcharts illustrating methods that support polar multi-layer coding multiple input multiple output scheme in accordance with one or more aspects of the present disclosure.

DETAILED DESCRIPTION

Figure 1:
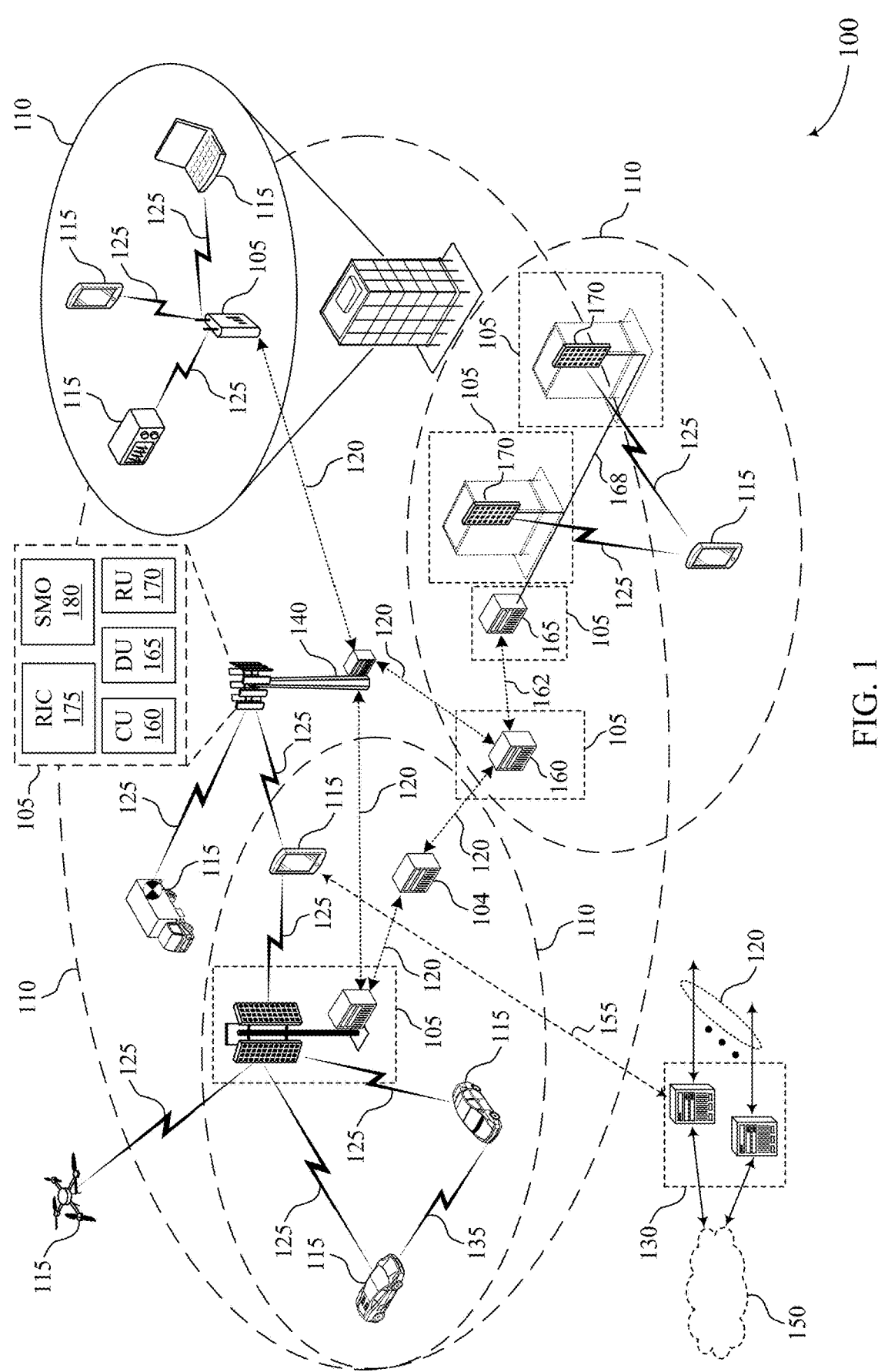
FIG. 1 shows an example of a wireless communications system that supports polar multi-layer coding multiple input multiple output scheme in accordance with one or more aspects of the present disclosure.

In wireless communications, devices may communicate using multiple input multiple output (MIMO) schemes. For example, MIMO schemes exploit multipath propagation from multiple transmission or reception antennas and may include communicating over multiple spatial layers concurrently. Some approaches to MIMO communications have included the use of multi-level coding (MLC), but the use of such MLC approaches (e.g., in which outer codes are connected or associated with different bits in modulation constellations) with some forward error correction techniques (e.g., low-density parity-check (LDPC) techniques) may result in reduced performance. Additionally, or alternatively, polar codes have been used in other approaches, but as block lengths increase, such codes become less efficient. For example, in the case of MIMO MLC LDPC techniques, and given an additive white gaussian noise (AWGN) channel as a first channel, layers may not share much common information. However, given a high correlation fading channel as a second channel, layers of the AWGN channel and the high correlation fading may share significant amounts of common information between them, which increases the difficulty of using fixed rate allocation techniques.

Polar MLC MIMO schemes may be employed in which polar codes are applied in conjunction with MLC techniques for MIMO communications. Such polar MLC MIMO schemes may involve polar coding in which multiple polar codes may be applied to corresponding sub-blocks (or other divisions) of a message. Such sub-blocks may be sub-divisions of code blocks, where the code blocks may be groups of bits of a packet (e.g., transport block) that are separately coded for transmission, and sub-blocks may be sub-divisions of such code blocks that may be of different sizes for different encoding schemes and such different sizes may depend on a scheme being used. . . . In some cases, sub-blocks may be of uniform lengths (e.g., a quantity of bits in each sub-block). Further, such polar MLC MIMO schemes may involve MLC techniques in which bit indices of the polar codes may be associated with different combinations of bit indices of a modulation and coding scheme (MCS) and multiple communication layers for MIMO communications. For example, a modulation and coding scheme may be associated with a modulation order (e.g., a quantity of different symbols that a modulation and coding scheme may be capable of transmitting) and a quantity of bits used for each symbol in a constellation may correspond with the modulation order. Further, MIMO communications may be employed in which communications between devices (e.g., a network entity and a UE) are transmitted over multiple communication layers using multiple antennas at the transmitting device, the receiving device, or both. To support such techniques, a UE may indicate a capability to operate in such a polar MLC MIMO scheme and a network entity may respond indicating a configuration for operation in the polar MLC MIMO scheme. Such a configuration may include a quantity of communication layers, a modulation and coding scheme (MCS), one or more other parameters, or any combination thereof. In some examples, the configuration may be selected from a set of configurations that are "valid" in that the parameters indicated therein satisfy one or more thresholds for those parameters (e.g., code block length, sub-block length, a quantity of modulation bits, a coding rate, one or more other parameters, or any combination thereof). In some examples, the UE may support the use of the scheme in situations in which sub-block lengths satisfy (e.g., are less than or equal to) a subcode length threshold (e.g., to preserve the efficiencies of the polar MLC MIMO scheme). The UE and the network entity may then communicate one or more messages in accordance with the polar MLC MIMO scheme and the configuration.

In at least these ways, communications performed in accordance with the polar MLC MIMO may approach associated theoretical capacities, complexity associated with encoding and decoding may be reduced (e.g., as compared to other approaches, as repetition of demodulation is not required, such codes are shorter, and reencoding may not be required in techniques employing polar codes, as the reencoding itself may be a byproduct of a decoding operation), spectral efficiency may be improved, errors may be reduced, labelling loss may be reduced, handling of rate allocation may be improved, the efficiency of decoding and encoding may be improved, or any combination thereof. Thus, a device or system utilizing the techniques described herein may enjoy increased throughput, increased capacity, increased signal quality, reduced errors, reduced latency, increased efficiency, or any combination thereof.

Aspects of the disclosure are initially described in the context of wireless communications systems. Aspects of the disclosure are then described with reference to a and a wireless communications system. Aspects of the disclosure are further illustrated by and described with reference to apparatus diagrams, system diagrams, and flowcharts that relate to polar multi-layer coding multiple input multiple output scheme.

FIG. 1 shows an example of a wireless communications system 100 that supports polar multi-layer coding multiple input multiple output scheme in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity

105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

According to various aspects, a UE 115 may include a capability to communicate in accordance with polar MLC MIMO communication scheme or may be of a class or category of UEs that may operate in accordance with such a scheme. The UE 115 may transmit an indication of such a capability or classification to the network entity, which may respond by transmitting a configuration for the polar MLC MIMO communication scheme that specifies one or more parameters for operation in the polar MLC MIMO communication scheme. The UE 115 and the network entity 105 may then communicate in accordance with the configuration (e.g., the parameters and associated thresholds indicated in the configuration) and the polar MLC MIMO communication scheme.

Figure 2:
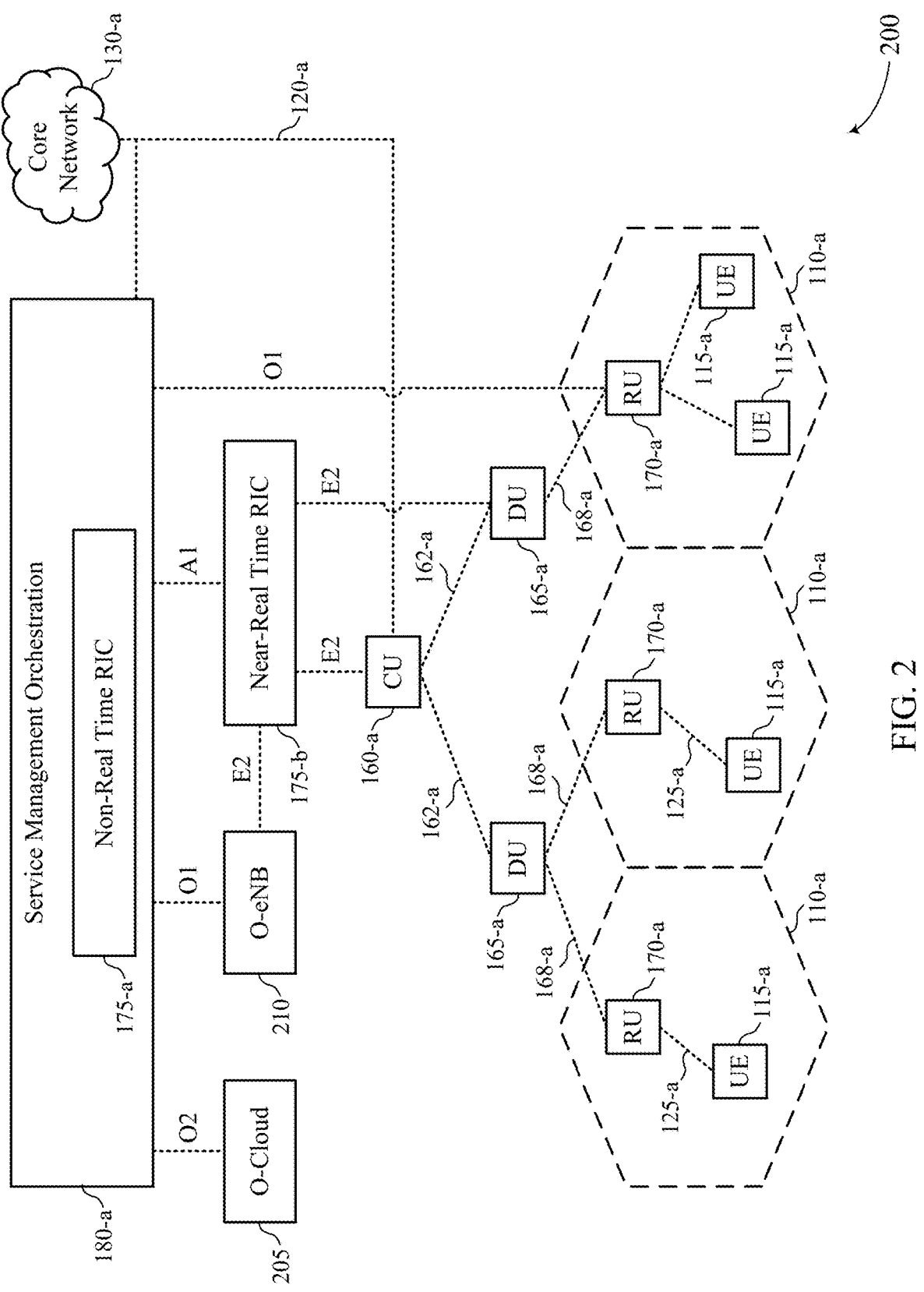
FIG. 2 shows an example of a network architecture that supports polar multi-layer coding multiple input multiple output scheme in accordance with one or more aspects of the present disclosure.

FIG. 2 shows an example of a network architecture 200 (e.g., a disaggregated base station architecture, a disaggregated RAN architecture) that supports polar multi-layer coding multiple input multiple output scheme in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functional-ity (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be imple-mented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an inter-face configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architec-ture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtu-alized network entities 105. For non-virtualized network entities 105, the SMO 180-a may be configured to support the deployment of dedicated physical resources for RAN coverage requirements which may be managed via an opera-tions and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface).

Additionally, or alternatively, in some implementations, the SMO 180-a may communicate directly with one or more RUs 170-a via an O1 interface. The SMO 180-a also may include a Non-RT RIC 175-a configured to support func-tionality of the SMO 180-a.

The Non-RT RIC 175-a may be configured to include a logical function that enables non-real-time control and opti-mization of RAN elements and resources, Artificial Intelli-gence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

Figure 3:
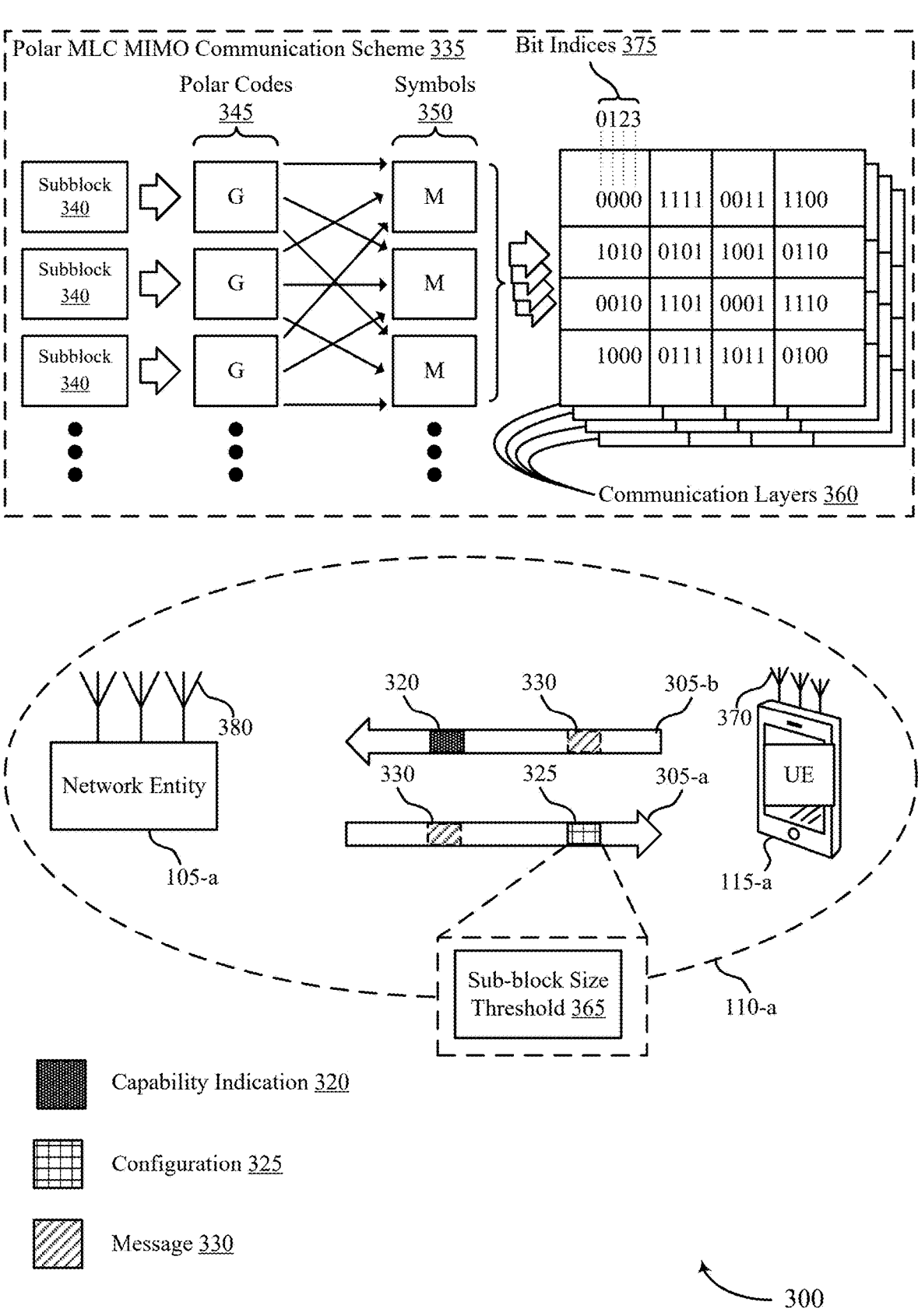
FIG. 3 shows an example of a wireless communications system that supports polar multi-layer coding multiple input multiple output scheme in accordance with one or more aspects of the present disclosure.

FIG. 3 shows an example of a wireless communications system 300 that supports polar multi-layer coding multiple input multiple output scheme in accordance with one or more aspects of the present disclosure. The wireless com-munications system 300 may include the network entity 105-a, which may be an example of one or more network entities discussed in relation to other figures. The wireless communications system 300 may include the UE 115-a, which may be an example of UEs discussed in relation to other figures.

In some examples, the UE 115-a may be located in a geographic coverage area 110-a that may be associated with the network entity 105-a. The network entity 105-a and UE 115-a may communicate via one or more downlink com-munication links 305-a and one or more uplink communi-cation links 305-b.

Some approaches using MIMO schemes may be consid-ered less than optimal, resulting in a significant deviation from theoretical communication capacities. Some potential solutions to mitigate this degradation could include the use of MLC. However, unlike its application at the bit level, MLC at the layer level may not interact effectively with LDPC.

In some approaches to wireless communications, polar codes may be used as error correcting codes for some transmissions (e.g., PDCCH transmissions). However, in some situations, polar codes may be less efficient than LDPC for long block length.

The use of polar MLC MIMO schemes for high spectral efficiency may be employed. Such schemes may exhibit improved performance, which could be attributed to the MLC, and potentially lower complexity, which may be attributable at least to smaller sub-block size, as compared to other schemes (e.g., BICM LDPC schemes).

Polar codes may involve the use of a kernel, which may be represented by G. In a 2-bit encoder, such a kernel may be represented by [u+v, v], where u is a first bit and v is a second bit. For example, a kernel may be represented as $$G_{[u+v,v]2} = F_{u+v,v} = \begin{bmatrix} 1 & 0 \\ 1 & 1 \end{bmatrix},$$

and as applied to the input U to produce the individual components, as in $$U_1^2 \cdot G_2 = X_1^2$$

gives the output $$X_1^2,$$

which is passed through the channel W to obtain the output Y, as expressed by $$X_1^2 \rightarrow W_1^2 \rightarrow Y_1^2.$$

A polar code of general size N may be expressed as $$G_{[u+v,v]N} = B_{[binary]BN} \cdot F_{u+v,v}^{\otimes n}, \quad U_0^{N-1} \cdot G_N = X_0^{N-1}, \text{ and}$$

$$X_0^{N-1} \rightarrow Y_0^{N-1} \rightarrow Z_0^{N-1}.$$

Thus, unlike other codes, an input and an output of a polar encoder may be of a same length (e.g., represented by N).

The use of such polar codes results in a polarization phenomenon in which some of the bits will see a "bit channel" with a block error rate (BER) of 0 (giving a capacity of 1) and other bits will see a "bit channel" with a BER of 0.5 (giving a capacity of 0). The proportion of noiseless bit channels converges (for a length N that is sufficiently large) to the channel capacity. Such a polarization phenomenon may be expressed as in Equation 1.

$$\begin{cases} |I_i > 1 - \epsilon| \\ |I_i < \epsilon| \\ |\epsilon < I_i < 1 - \epsilon| \end{cases} \rightarrow \begin{cases} I(U;Y) \\ 1 - I(U;Y) \\ 0 \end{cases} \qquad \text{Equation 1}$$

In association with an encoding procedure for polar codes with a given channel capacity, the indexes of the N bit channels may be sorted. To transmit using a rate R, a device may transmit data in one or more bit channels (e.g., K bit channels) based on capacity and BER (e.g., a maximal capacity/minimum BER), where $$\frac{K}{N} = R.$$

In the other N−K bits, fixed or frozen bits (e.g., known values) may be placed.

For decoding polar-encoded bits, different decoders may be used. For example, a successive cancellation list (SCL)

decoder may be employed. Such a decoder may be used due to BLER performance characteristics of the SCL decoder. In some examples, a decoder complexity may be represented by O(L·N·log(N)). Thus, the shorter the block length, the less the complexity and the smaller the list size.

MLC techniques may also be employed in conjunction with the polar coding techniques In MLC approaches, a quantity (e.g., m) outer codes may be used, which may be the polar codes 345. In some examples, each outer code may correspond to a sub-block 340 or other division of a message, such as the message 330 that is to be transmitted using the techniques described herein. Such outer codes may also be represented by $$G_{\frac{N}{m}},$$

where G is the outer code indexed by the length of the message N and the quantity of sub-blocks 340 m. Further, the quantity of sub-blocks m may also correspond with a quantity of bits in the constellations 355, which may be respectively associated with individual layers of the communication layers 360. In some examples, communications may be performed over the various communication layers 360 using multiple antennas 380 at the network entity 105-a, multiple antennas 370 at the UE 115-a, or any combination thereof.

In some examples, each outer code $$G_{\frac{N}{m},i}$$

may be connected to or associated with an i-th bit in the constellations 355. For example, the different outer codes (e.g., the polar codes 345) may each be associated with i-th bits (e.g., in accordance with the bit indices 375, which may be applicable to any of the symbols of the communication layers 360. For example, reference to a bit index may describe an index of a particular symbol. Additionally, or alternatively, bit indices may be numbered across an entire constellation, communication layer 360, or in any other manner) in the symbols 350 of the constellations 355. Further, the use of MLC techniques may be compatible with set partitioning (SP) techniques that may maximize one or more Euclidian distances. In some examples, the use of MLC may be favorable as shown by the information chain rule, in which $$I(U;Y) = \sum_{i=1}^{m} I\left(U_i; Y | U_1^{i-1}\right).$$

For example, bits in the symbols of the constellations 355 may be considered in a sequential manner and the decoding at each stage or level may be based on the decoding performed at an earlier stage. For example, a first decoded bit may be compared to bits of the symbols of the constellations 355. If the decoded bit is a zero, then those possible constellation positions that include a 0 in that first position may be eligible for further selection or processing (e.g., a next stage or level), while those constellation positions that include a 1 in that first positions may not be considered. A subsequent stage or level may then consider a next decoded bit and next bit positions of the constellations to further narrow the pool of possible symbols and so on and so forth, until the symbol is successfully decoded.

In some examples, such MLC techniques may be applied across multiple constellations 355 associated with multiple communication layers 360 for MIMO communications. For example, the sequential process of decoding may consider bits of symbols of constellations 355 across multiple layers, thereby supporting the use of polar codes and MLC techniques for MIMO communications.

Thus polar MLC MIMO techniques may be employed which may yield improved performance and lower complexity as compared to other approaches that may show degradations as compared to theoretical capacities. For example, a MIMO MLC LDPC approach may be improved upon. In SISO MLC approaches, the gain achieved from MLC approaches (e.g., compared with BICM) is small. Instead, the gain from MLC comes from extra information obtained from performing other computations (e.g., when we compute something given something else). For example, in constellation bit-level MLC (e.g., in a SISO case), the gain comes from increasing the Euclidean minimal distance using the knowledge of previous bits.

However, in MIMO communications (e.g., unlike in SISO communications) the use of MLC on a layer level may lead to large gains. For example, in layer level MLC, the gain comes from the correlation between the layers. In order to obtain gains from layer level MLC, a demodulator may obtain these gains from the extra information of the previously decoded bits. For example, MMSE approaches may not obtain such gains.

However, MIMO MLC LDPC approaches may include inherent issues, including rate allocation issues. For example, consider a situation with two MIMO channels (e.g., an additive white gaussian nose (AWGN) channel (or some other diagonal fading channel) and some other high correlation fading channel. In the first AWGN channel, one layer may not provide any information about the other layer, and the layers' rates will therefore be equal. In the second high correlation fading channel, each layer may provide substantial amounts of information about a next layer-meaning that a rate of the last layer may be high compared to the first layer. However, such a scenario is problematic, as fixed rate allocation may not be possible in such a scheme.

Thus, a polar MLC MIMO scheme, such as the polar MLC MIMO communication scheme 335 may be employed. In the polar MLC MIMO communication scheme 335, the MLC techniques may be performed at a bit level or at a layer level. This may differ from a SISO MLC (e.g., a regular bit level MLC), as using MIMO MLC at a layer level may improve performance. Further, the difference in complexity is in favor of the use of MLC. For example, in an MLC-based approach (e.g., the polar MLC MIMO communication scheme 335) several LLR calculations may be performed (e.g., pruning results based on a demodulator), but demodulation may not be repeated and shorter codes may be used. Some MLC approaches may involve re-encoding. However, in the polar MLC MIMO communication scheme 335 (which employs polar codes), re-encoding is not required, as it is a byproduct of the decoding process.

In some examples, a main challenge in approaches that employ MLC is rate allocation (e.g., according to a specific bit or layer capacity). However, unlike bit capacity (which is a function of SP labeling that considers Euclidian distance), layer capacity is channel dependent. Specifically, when using polar codes, rate allocation processes are no longer an issue, as the rate allocation is a result of the frozen or fixed bits that are employed. For example, by using polar codes, the rate allocation is a function of both the channel and the code. If the code is long enough, the channel influence may be small and manageable by using list decoding (e.g., similar to BICM polar codes in fading channels). Thus, there is no extra effort or complexity involved in the polar MLC MIMO communication scheme 335 compared to a competing polar BICM scheme.

In some examples, polar codes may be more efficient in scenarios involving shorter code lengths and the use of MLC techniques (e.g., with k stages) may decrease the length of a code block by 1/k. For example, given 4 layers with 256QAM modulation, that may result in 4×8=32 stages. Therefore, instead of 1 code block of 8 k length, 32 sub code blocks of length 256 may be employed. The higher the spectral efficiency, the more stages may be involved. Thus, the smaller the sub-block size, performance and complexity are improved. For example, an 8 k MLC block that includes 32 smaller sub code blocks of size 256 is much better (e.g., in terms of errors) than the equivalent 8 k BICM code.

In some examples, the use of MLC also results in more extreme code rate sets (e.g., that includes both lower and higher elements). Polar coding is complementary to the use of MLC, as polar decoders are more efficient in extreme rates (e.g., close to zero or one) which lines up with the more extreme code rates resulting from the use of MLC).

To support such polar MLC MIMO schemes, such as the polar MLC MIMO communication scheme 335, signaling may be employed to coordinate parameters or other information associated with the polar MLC MIMO communication scheme 335. For example, the UE 115-a may transmit the capability indication 320, which may indicate the capability of the UE 115-a to operate within a polar MLC MIMO, such as the polar MLC MIMO communication scheme 335. Additionally, or alternatively, the UE 115-a may participate the polar MLC MIMO communication scheme 335 based on the UE 115-a being of a type, classification, or category of UEs that may operate in accordance with the polar MLC MIMO communication scheme 335. In some examples, the capability of the UE 115-a may be based on such a type, classification, or category of UE to which the UE 115-a belongs.

In some examples, the UE 115-a may support the use of the polar MLC MIMO communication scheme 335 for polar codes employing a sub-block code length up to a threshold, such as the sub-block size threshold 365 (e.g., which may be indicated by the network entity 105-a in the configuration 325). For example, if the UE 115-a supports the scheme up to a length of n=512 (e.g., a threshold value of 512), the block length is N=8192, 2 communication layers are used, and a 16QAM (4 bit) modulation order is employed, then the MLC sub-block size may be expressed by N/layers/bits=8192/2/4=1024. In such a case, the sub-block size may be greater than the threshold value of 512 and the polar MLC MIMO communication scheme 335 may not be used. For example, a BICM LDPC scheme may be employed. However, if the block length is N=8192, 4 communication layers are employed, and a 256QAM (8 bits) modulation order is employed, then the MLC sub code block size may be 8192/4/8=256, which is less than the threshold value of 512. As a result of satisfying the threshold, the polar MLC MIMO communication scheme 335 may be employed for communications between the UE 115-a and the network entity 105-a.

In some examples, the network entity 105-a may transmit the configuration 325 to the UE 115-a to configure one or more parameters associated with the polar MLC MIMO communication scheme 335. For example, the network entity 105-a may determine in what combination of layers (e.g., a quantity of layers) and MCS (e.g., a modulation order, a quantity of bits used, a coding rate, one or more other parameters, or any combination thereof) may be employed in the polar MLC MIMO communication scheme 335. Further, in some examples, the configuration 325 may indicate a sub-block size threshold 365. In some examples, the determination made by the network entity 105-a may be based on MLC sub-block length. For example, schemes that are associated with an MLC sub-blocks length satisfying a threshold (e.g., below a threshold) may be valid schemes. Additionally, or alternatively, the determination made by the network entity 105-a may be based on the particular combination of the quantity of layers and the MCS (or one or more related parameters).

The network entity 105-a and the UE 115-a may communicate the message 330 (e.g., an uplink message, a downlink message, or other message) based on the scheme configuration. For example, the network entity 105-a may transmit the message 330 to the UE 115-a and the UE 115-a may decode the data of the message 330 based on the scheme configuration. In some examples, if the sub-block size threshold 365 is satisfied, the UE 115-a and the network entity 105-a may communicate in accordance with the polar MLC MIMO communication scheme 335. However, in some examples, if the sub-block size threshold 365 is not satisfied, a different communication scheme may be used for communications between the network entity 105-a and the UE 115-a.

Figure 4:
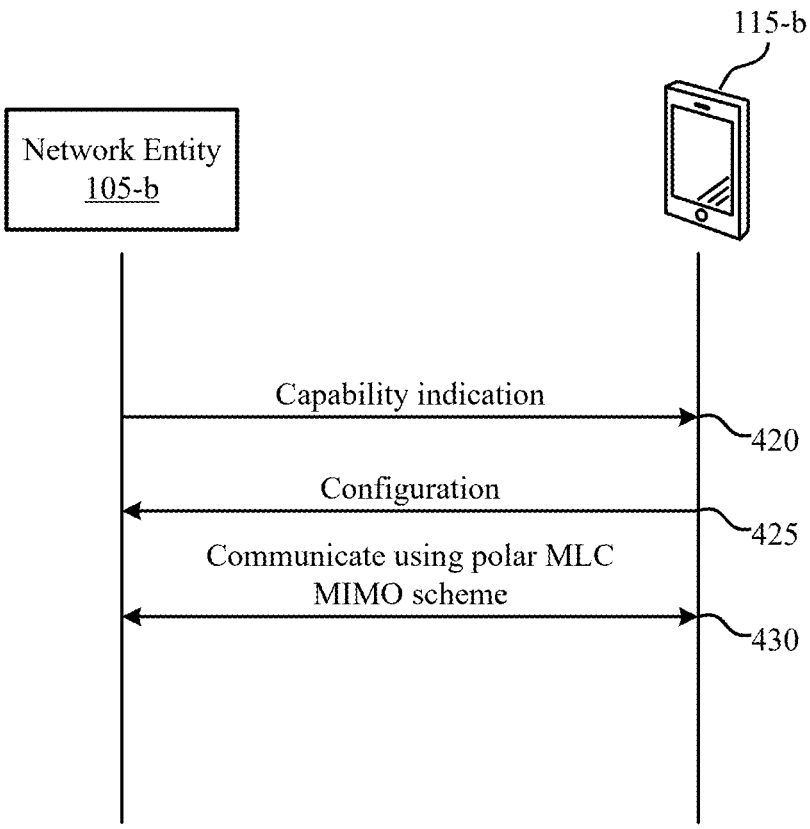
FIG. 4 shows an example of a process flow that supports polar multi-layer coding multiple input multiple output scheme in accordance with one or more aspects of the present disclosure.

FIG. 4 shows an example of a process flow 400 that supports polar multi-layer coding multiple input multiple output scheme in accordance with one or more aspects of the present disclosure. The process flow 400 may implement various aspects of the present disclosure described herein. The elements described in the process flow 400 (e.g., UE 115-b and network entity 105-b) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-b may transmit an indication of a capability of the UE to communicate in accordance with a polar multi-layer coding (MLC) multiple input multiple output (MIMO) communication scheme. In some examples, the indication of the capability of the UE to communicate in accordance with the polar MLC MIMO communication scheme may include a sub-block size capability and the sub-block size threshold is based on the sub-block size capability. In some examples, the capability of the UE is associated with a UE category to which the UE belongs.

At 425, the UE 115-b may receive a configuration for communication in accordance with the polar MLC MIMO communication scheme, wherein the configuration indicates a sub-block size threshold. In some examples, the configuration indicates a first configuration of a plurality of valid configurations for the polar MLC MIMO communication scheme. In some examples, respective sub-block sizes of the plurality of valid configurations each satisfy the sub-block size threshold. In some examples, the configuration indicates a quantity of layers associated with the polar MLC MIMO communication scheme, a modulation and coding scheme, or any combination thereof.

At 430, the UE 115-b may communicate a message in accordance with the polar MLC MIMO communication scheme based on a determination that a sub-block size for the message satisfies the sub-block size threshold. In some examples, the sub-block size for the message is based on a code block length associated with the message, a quantity of communication layers associated with the message, a quantity of modulation bits associated with the message, a coding rate associated with the message, or any combination thereof. In some examples, the sub-block size is less than the sub-block size threshold. In some examples, the polar MLC MIMO communication scheme may include application of a plurality of polar codes to sub-blocks of the message and bit indices (e.g., the bit indices 375 depicted in FIG. 3, which may be applicable to any of the symbols of the communication layers 360. For example, reference to a bit index may describe an index of a particular symbol. Additionally, or alternatively, bit indices may be numbered across an entire constellation, communication layer 360, or in any other manner) of respective polar codes of the plurality of polar codes are associated with different combinations of bit positions associated with a modulation order and layers of a plurality of communication layers of the polar MLC MIMO communication scheme. In some examples, the polar MLC MIMO communication scheme may include constellation-level MLC or layer-level MLC. For example, as described herein, MLC techniques (e.g., sequential decoding across multiple stages) may be performed in association with symbols within a single constellation (e.g., which may be referred to as constellation-level MLC) or in association with symbols across multiple constellations associated with multiple communication layers (e.g., which may be referred to as layer-level MLC).

Figure 5:
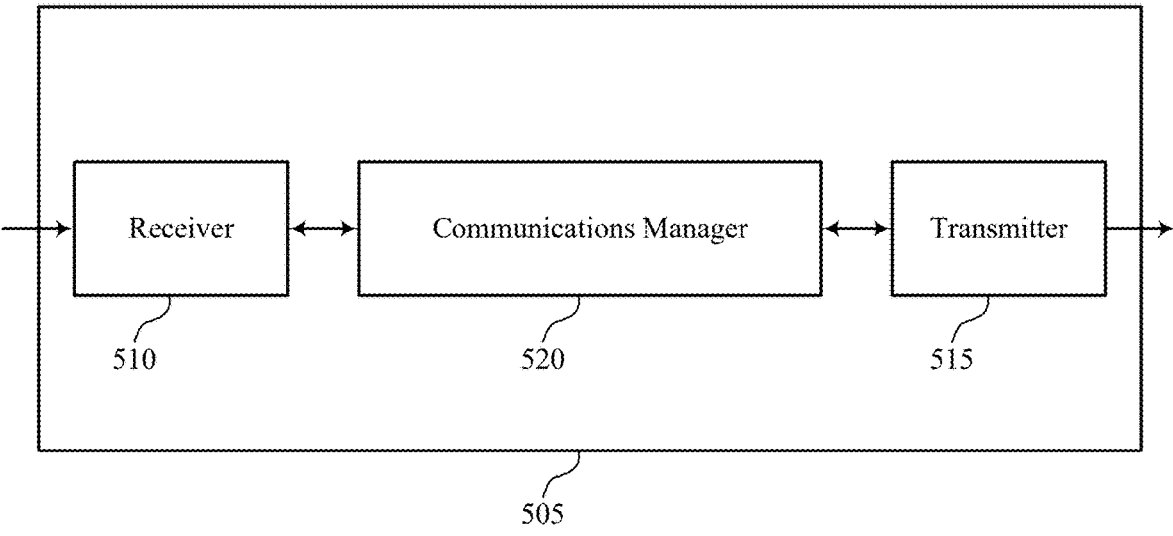
FIGS. 5 and 6 show block diagrams of devices that support polar multi-layer coding multiple input multiple output scheme in accordance with one or more aspects of the present disclosure.

FIG. 5 shows a block diagram 500 of a device 505 that supports polar multi-layer coding multiple input multiple output scheme in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to polar multi-layer coding multiple input multiple output scheme). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to polar multi-layer coding multiple input multiple output scheme). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of polar multi-layer coding multiple input multiple output scheme as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications in accordance with examples as disclosed herein. For example, the communications manager 520 is capable of, configured to, or operable to support a means for transmitting an indication of a capability of the UE to communicate in accordance with a polar multi-layer coding (MLC) multiple input multiple output (MIMO) communication scheme. The communications manager 520 is capable of, configured to, or operable to support a means for receiving a configuration for communication in accordance with the polar MLC MIMO communication scheme, wherein the configuration indicates a sub-block size threshold. The communications manager 520 is capable of, configured to, or operable to support a means for communicating a message in accordance with the polar MLC MIMO communication scheme based on a determination that a sub-block size for the message satisfies the sub-block size threshold.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
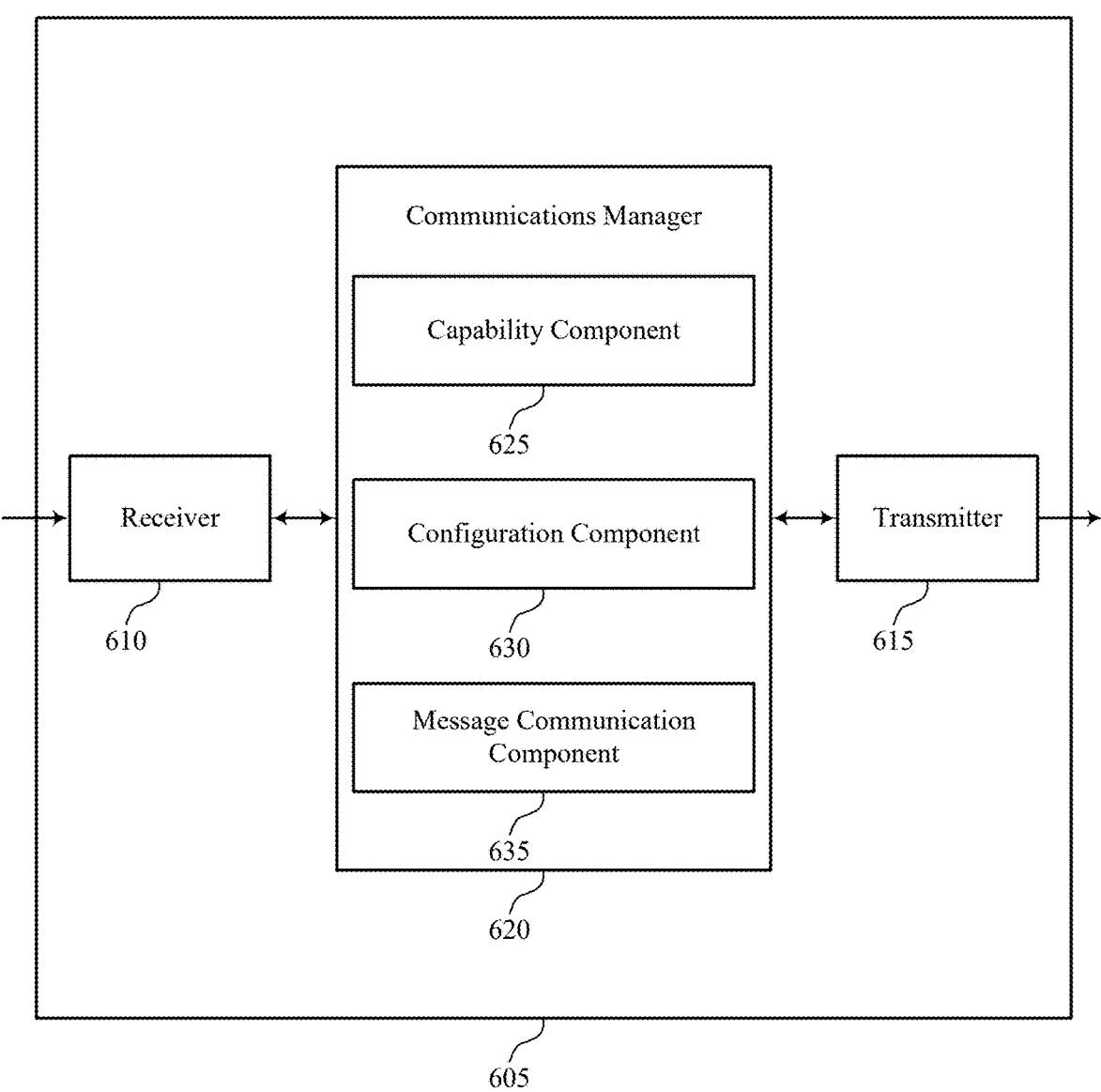

FIG. 6 shows a block diagram 600 of a device 605 that supports polar multi-layer coding multiple input multiple output scheme in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to polar multi-layer coding multiple input multiple output scheme). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to polar multi-layer coding multiple input multiple output scheme). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of polar multi-layer coding multiple input multiple output scheme as described herein. For example, the communications manager 620 may include a capability component 625, a configuration component 630, a message communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The capability component 625 is capable of, configured to, or operable to support a means for transmitting an indication of a capability of the UE to communicate in accordance with a polar multi-layer coding (MLC) multiple input multiple output (MIMO) communication scheme. The configuration component 630 is capable of, configured to, or operable to support a means for receiving a configuration for communication in accordance with the polar MLC MIMO communication scheme, wherein the configuration indicates a sub-block size threshold. The message communication component 635 is capable of, configured to, or operable to support a means for communicating a message in accordance with the polar MLC MIMO communication scheme based on a determination that a sub-block size for the message satisfies the sub-block size threshold.

Figure 7:
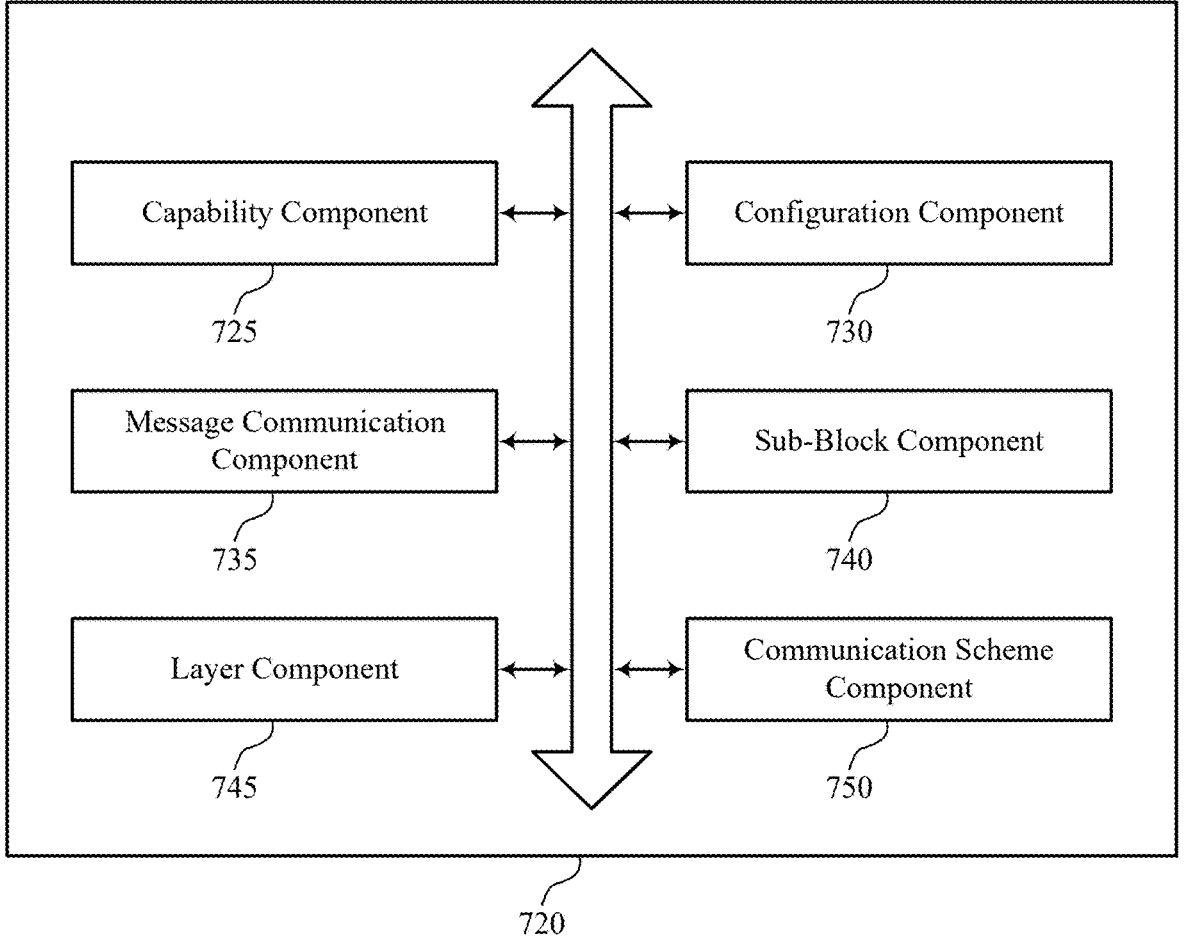
FIG. 7 shows a block diagram of a communications manager that supports polar multi-layer coding multiple input multiple output scheme in accordance with one or more aspects of the present disclosure.

FIG. 7 shows a block diagram 700 of a communications manager 720 that supports polar multi-layer coding multiple input multiple output scheme in accordance with one or more aspects of the present disclosure. The communications manager 720 may be an example of aspects of a communications manager 520, a communications manager 620, or both, as described herein. The communications manager 720, or various components thereof, may be an example of means for performing various aspects of polar multi-layer coding multiple input multiple output scheme as described herein. For example, the communications manager 720 may include a capability component 725, a configuration component 730, a message communication component 735, a sub-block component 740, a layer component 745, a communication scheme component 750, or any combination thereof. Each of these components, or components or subcomponents thereof (e.g., one or more processors, one or more memories), may communicate, directly or indirectly, with one another (e.g., via one or more buses).

Additionally, or alternatively, the communications manager 720 may support wireless communications in accordance with examples as disclosed herein. The capability component 725 is capable of, configured to, or operable to support a means for transmitting an indication of a capability of the UE to communicate in accordance with a polar multi-layer coding (MLC) multiple input multiple output (MIMO) communication scheme. The configuration component 730 is capable of, configured to, or operable to support a means for receiving a configuration for communication in accordance with the polar MLC MIMO communication scheme, wherein the configuration indicates a sub-block size threshold. The message communication component 735 is capable of, configured to, or operable to support a means for communicating a message in accordance with the polar MLC MIMO communication scheme based on a determination that a sub-block size for the message satisfies the sub-block size threshold.

In some examples, the sub-block size for the message is based on a code block length associated with the message, a quantity of communication layers associated with the message, a quantity of modulation bits associated with the message, a coding rate associated with the message, or any combination thereof.

In some examples, the indication of the capability of the UE to communicate in accordance with the polar MLC MIMO communication scheme includes a sub-block size capability, where the sub-block size threshold is based on the sub-block size capability.

In some examples, the configuration indicates a first configuration of a set of multiple valid configurations for the polar MLC MIMO communication scheme. In some examples, respective sub-block sizes of the set of multiple valid configurations each satisfy the sub-block size threshold.

In some examples, the configuration indicates a quantity of layers associated with the polar MLC MIMO communication scheme, a modulation and coding scheme, or any combination thereof.

In some examples, the sub-block size is less than the sub-block size threshold.

In some examples, the polar MLC MIMO communication scheme includes application of a set of multiple polar codes to sub-blocks of the message, where bit indices of respective polar codes of the set of multiple polar codes are associated with different combinations of bit positions associated with a modulation order and layers of a set of multiple communication layers of the polar MLC MIMO communication scheme.

In some examples, the capability of the UE is associated with a UE category to which the UE belongs.

In some examples, the polar MLC MIMO communication scheme includes constellation-level MLC or layer-level MLC.

Figure 8:
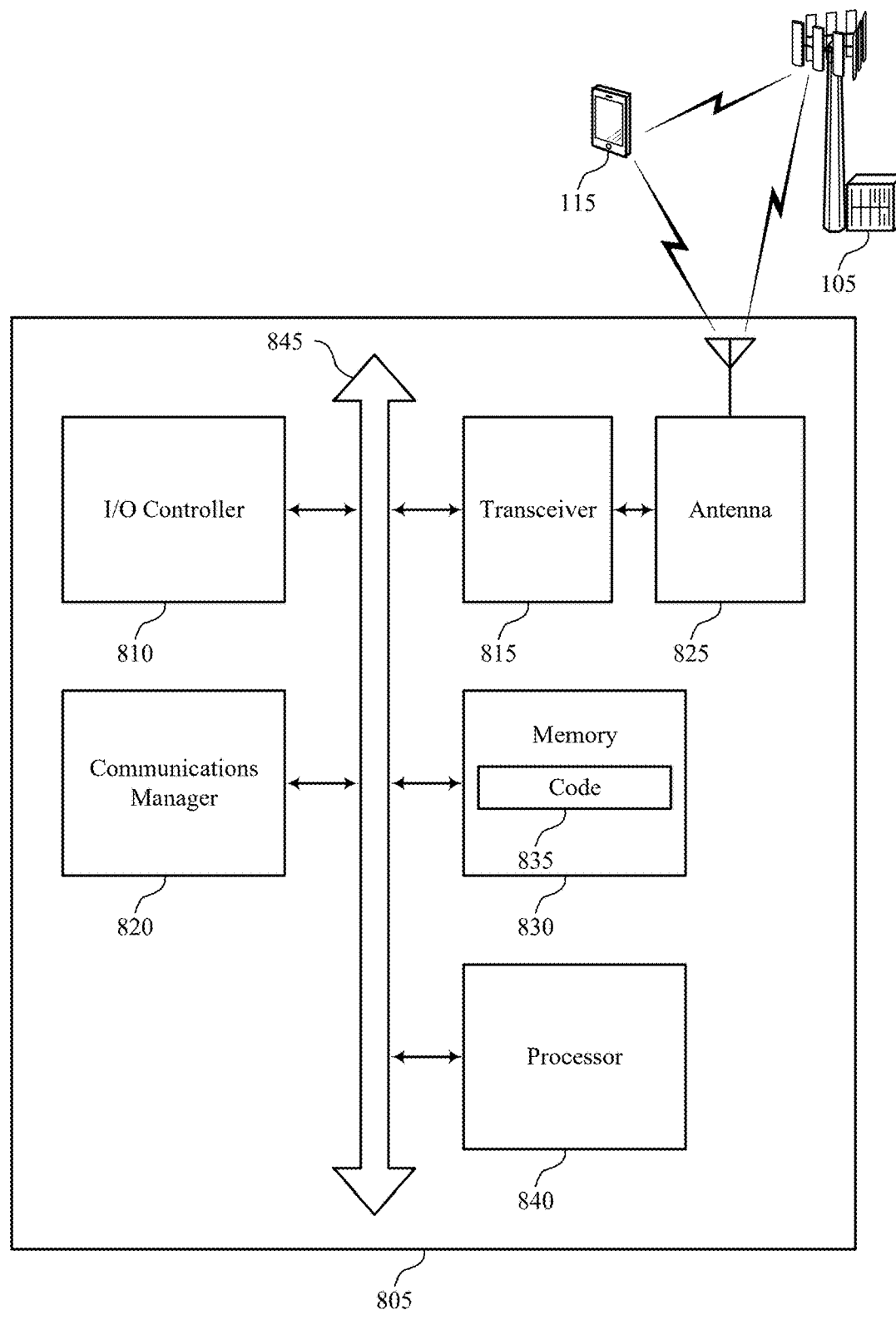
FIG. 8 shows a diagram of a system including a device that supports polar multi-layer coding multiple input multiple output scheme in accordance with one or more aspects of the present disclosure.

FIG. 8 shows a diagram of a system 800 including a device 805 that supports polar multi-layer coding multiple input multiple output scheme in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting polar multi-layer coding multiple input multiple output scheme). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

Additionally, or alternatively, the communications manager 820 may support wireless communications in accordance with examples as disclosed herein. For example, the communications manager 820 is capable of, configured to, or operable to support a means for transmitting an indication of a capability of the UE to communicate in accordance with a polar multi-layer coding (MLC) multiple input multiple output (MIMO) communication scheme. The communications manager 820 is capable of, configured to, or operable to support a means for receiving a configuration for communication in accordance with the polar MLC MIMO communication scheme, wherein the configuration indicates a sub-block size threshold. The communications manager 820 is capable of, configured to, or operable to support a means for communicating a message in accordance with the polar MLC MIMO communication scheme based on a determination that a sub-block size for the message satisfies the sub-block size threshold.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of polar multi-layer coding multiple input multiple output scheme as described herein, or the at least one processor 840 and the at least one memory 830 may be otherwise configured to, individually or collectively, perform or support such operations.

Figure 9:
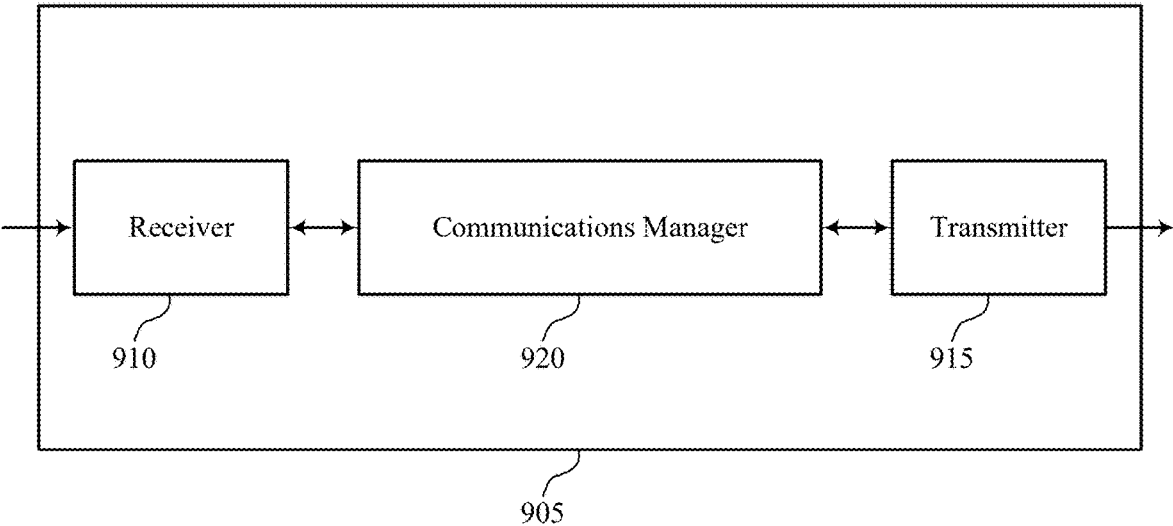
FIGS. 9 and 10 show block diagrams of devices that support polar multi-layer coding multiple input multiple output scheme in accordance with one or more aspects of the present disclosure.

FIG. 9 shows a block diagram 900 of a device 905 that supports polar multi-layer coding multiple input multiple output scheme in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of polar multi-layer coding multiple input multiple output scheme as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications in accordance with examples as disclosed herein. For example, the communications manager 920 is capable of, configured to, or operable to support a means for obtaining an indication of a capability of a UE to communicate in accordance with a polar multi-layer coding (MLC) multiple input multiple output (MIMO) communication scheme. The communications manager 920 is capable of, configured to, or operable to support a means for outputting a configuration for communication in accordance with the polar MLC MIMO communication scheme, wherein the configuration indicates a sub-block size threshold. The communications manager 920 is capable of, configured to, or operable to support a means for communicating a message in accordance with the polar MLC MIMO communication scheme based on a determination that a sub-block size for the message satisfies the sub-block size threshold.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, more efficient utilization of communication resources, or any combination thereof.

Figure 10:
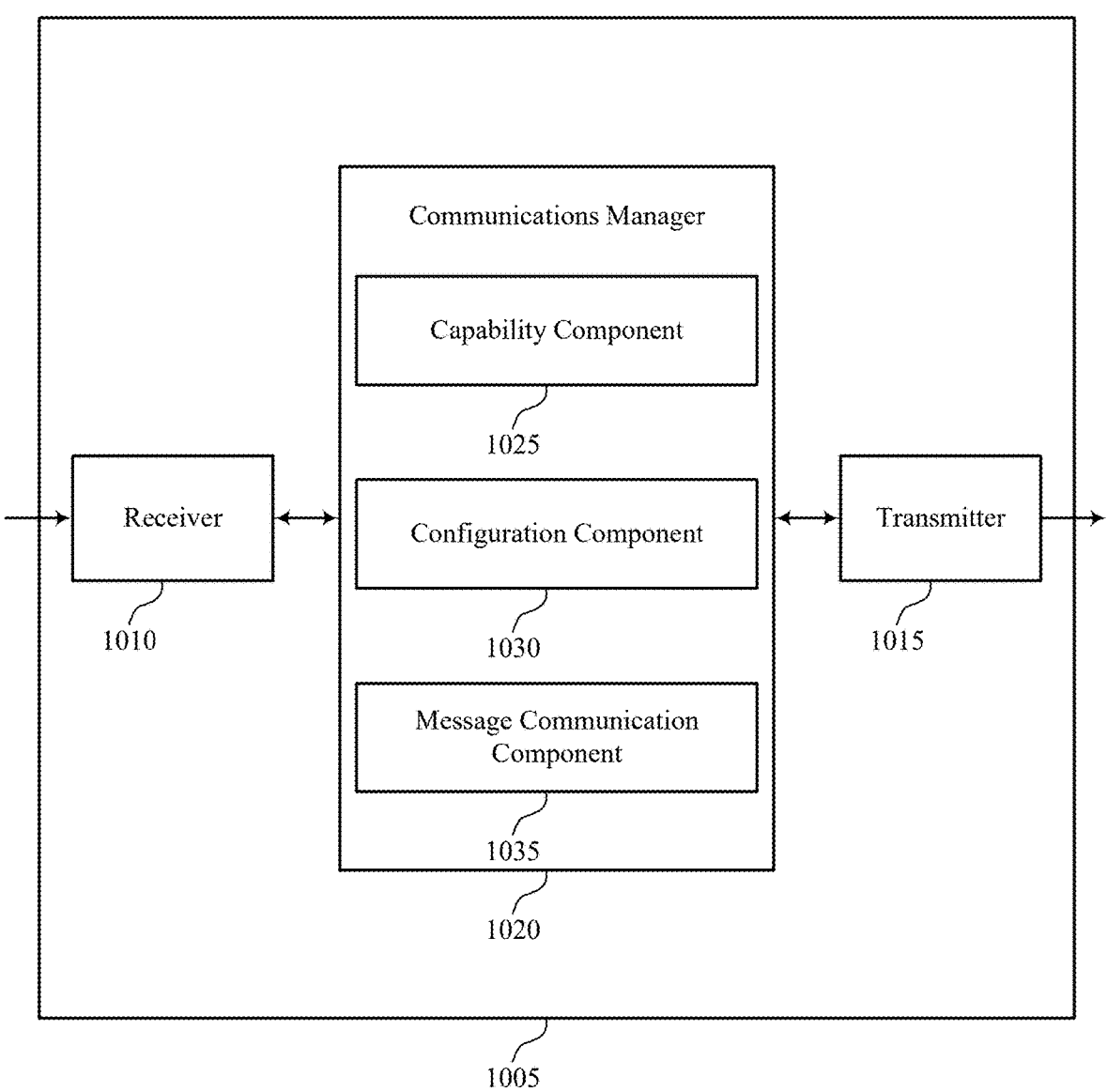

FIG. 10 shows a block diagram 1000 of a device 1005 that supports polar multi-layer coding multiple input multiple output scheme in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of polar multi-layer coding multiple input multiple output scheme as described herein. For example, the communications manager 1020 may include a capability component 1025, a configuration component 1030, a message communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The capability component 1025 is capable of, configured to, or operable to support a means for obtaining an indication of a capability of a UE to communicate in accordance with a polar multi-layer coding (MLC) multiple input multiple output (MIMO) communication scheme. The configuration component 1030 is capable of, configured to, or operable to support a means for outputting a configuration for communication in accordance with the polar MLC MIMO communication scheme, wherein the configuration indicates a sub-block size threshold. The message communication component 1035 is capable of, configured to, or operable to support a means for communicating a message in accordance with the polar MLC MIMO communication scheme based on a determination that a sub-block size for the message satisfies the sub-block size threshold.

Figure 11:
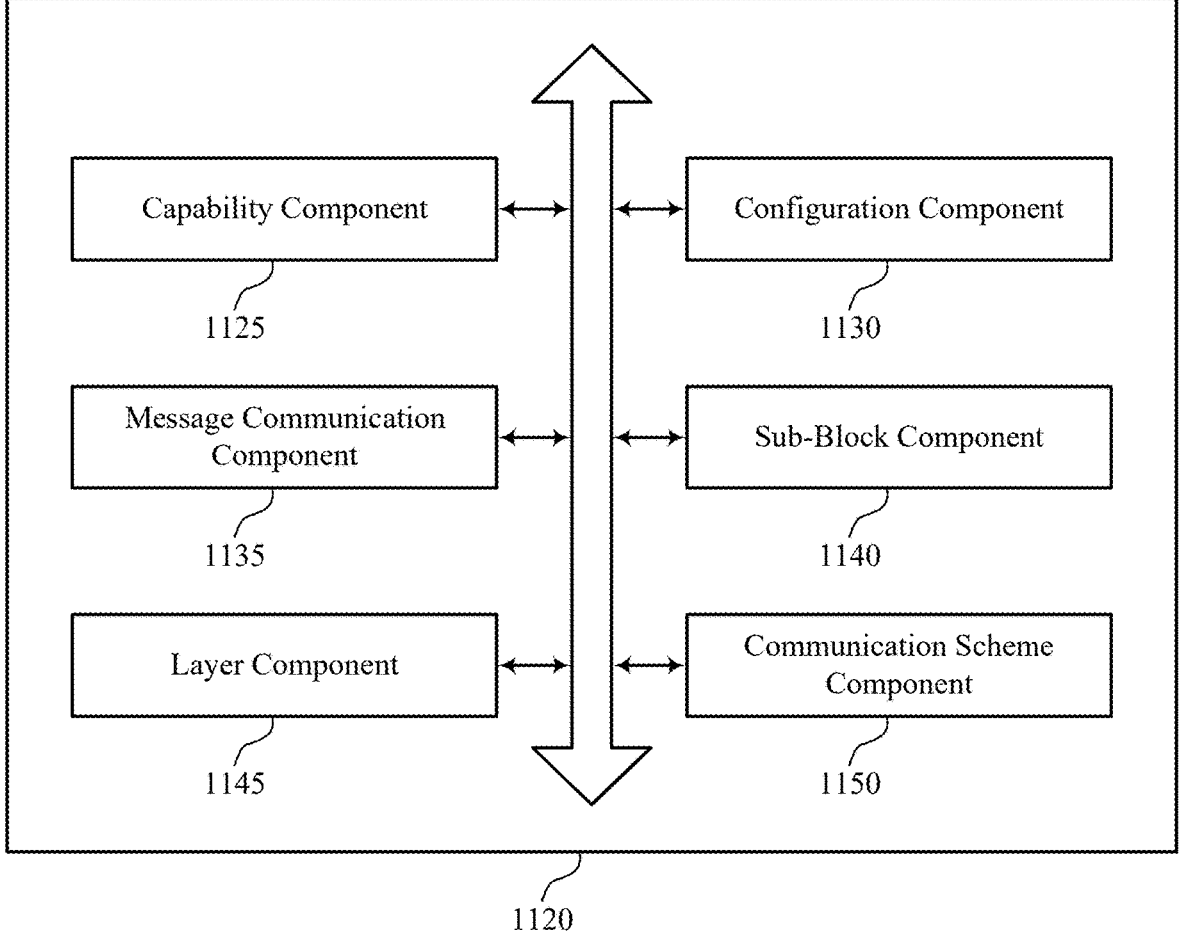
FIG. 11 shows a block diagram of a communications manager that supports polar multi-layer coding multiple input multiple output scheme in accordance with one or more aspects of the present disclosure.

FIG. 11 shows a block diagram 1100 of a communications manager 1120 that supports polar multi-layer coding multiple input multiple output scheme in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of polar multi-layer coding multiple input multiple output scheme as described herein. For example, the communications manager 1120 may include a capability component 1125, a configuration component 1130, a message communication component 1135, a sub-block component 1140, a layer component 1145, a communication scheme component 1150, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1120 may support wireless communications in accordance with examples as disclosed herein. The capability component 1125 is capable of, configured to, or operable to support a means for obtaining an indication of a capability of a UE to communicate in accordance with a polar multi-layer coding (MLC) multiple input multiple output (MIMO) communication scheme. The configuration component 1130 is capable of, configured to, or operable to support a means for outputting a configuration for communication in accordance with the polar MLC MIMO communication scheme, wherein the configuration indicates a sub-block size threshold. The message communication component 1135 is capable of, configured to, or operable to support a means for communicating a message in accordance with the polar MLC MIMO communication scheme based on a determination that a sub-block size for the message satisfies the sub-block size threshold.

In some examples, the sub-block size for the message is based on a code block length associated with the message, a quantity of communication layers associated with the message, a quantity of modulation bits associated with the message, a coding rate associated with the message, or any combination thereof.

In some examples, the indication of the capability of the UE to communicate in accordance with the polar MLC MIMO communication scheme includes a sub-block size capability, where the sub-block size threshold is based on the sub-block size capability.

In some examples, the configuration indicates a first configuration of a set of multiple valid configurations for the polar MLC MIMO communication scheme. In some examples, respective sub-block sizes of the set of multiple valid configurations each satisfy the sub-block size threshold.

In some examples, the configuration indicates a quantity of layers associated with the polar MLC MIMO communication scheme, a modulation and coding scheme, or any combination thereof.

In some examples, the sub-block size is less than the sub-block size threshold.

In some examples, the polar MLC MIMO communication scheme includes application of a set of multiple polar codes to sub-blocks of the message, where bit indices of respective polar codes of the set of multiple polar codes are associated with different combinations of bit positions associated with a modulation order and layers of a set of multiple communication layers of the polar MLC MIMO communication scheme.

In some examples, the capability of the UE is associated with a UE category to which the UE belongs.

In some examples, the polar MLC MIMO communication scheme includes constellation-level MLC or layer-level MLC.

Figure 12:
FIG. 12 shows a diagram of a system including a device that supports polar multi-layer coding multiple input multiple output scheme in accordance with one or more aspects of the present disclosure.

FIG. 12 shows a diagram of a system 1200 including a device 1205 that supports polar multi-layer coding multiple input multiple output scheme in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or pro-cessor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting polar multi-layer coding multiple input multiple output scheme). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

Additionally, or alternatively, the communications manager 1220 may support wireless communications in accordance with examples as disclosed herein. For example, the communications manager 1220 is capable of, configured to, or operable to support a means for obtaining an indication of a capability of a UE to communicate in accordance with a polar multi-layer coding (MLC) multiple input multiple output (MIMO) communication scheme. The communications manager 1220 is capable of, configured to, or operable to support a means for outputting a configuration for communication in accordance with the polar MLC MIMO communication scheme, wherein the configuration indicates a sub-block size threshold. The communications manager 1220 is capable of, configured to, or operable to support a means for communicating a message in accordance with the polar MLC MIMO communication scheme based on a determination that a sub-block size for the message satisfies the sub-block size threshold.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of polar multi-layer coding multiple input multiple output scheme as described herein, or the at least one processor 1235 and the at least one memory 1225 may be otherwise configured to, individually or collectively, perform or support such operations.

FIG. 13 shows a flowchart illustrating a method 1300 that supports polar multi-layer coding multiple input multiple output scheme in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting an indication of a capability of the UE to communicate in accordance with a polar multi-layer coding (MLC) multiple input multiple output (MIMO) communication scheme. The operations of 1305 may be performed in accordance with examples as disclosed herein. In some examples, aspects of the operations of 1305 may be performed by a capability component 725 as described with reference to FIG. 7.

At 1310, the method may include receiving a configuration for communication in accordance with the polar MLC MIMO communication scheme, wherein the configuration indicates a sub-block size threshold. The operations of 1310 may be performed in accordance with examples as disclosed herein. In some examples, aspects of the operations of 1310 may be performed by a configuration component 730 as described with reference to FIG. 7.

At 1315, the method may include communicating a message in accordance with the polar MLC MIMO communication scheme based on a determination that a sub-block size for the message satisfies the sub-block size threshold. The operations of 1315 may be performed in accordance with examples as disclosed herein. In some examples, aspects of the operations of 1315 may be performed by a message communication component 735 as described with reference to FIG. 7.

FIG. 14 shows a flowchart illustrating a method 1400 that supports polar multi-layer coding multiple input multiple output scheme in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include obtaining an indication of a capability of a UE to communicate in accordance with a polar multi-layer coding (MLC) multiple input multiple output (MIMO) communication scheme. The operations of 1405 may be performed in accordance with examples as disclosed herein. In some examples, aspects of the operations of 1405 may be performed by a capability component 1125 as described with reference to FIG. 11.

At 1410, the method may include outputting a configuration for communication in accordance with the polar MLC MIMO communication scheme, wherein the configuration indicates a sub-block size threshold. The operations of 1410 may be performed in accordance with examples as disclosed herein. In some examples, aspects of the operations of 1410 may be performed by a configuration component 1130 as described with reference to FIG. 11.

At 1415, the method may include communicating a message in accordance with the polar MLC MIMO communication scheme based on a determination that a sub-block size for the message satisfies the sub-block size threshold. The operations of 1415 may be performed in accordance with examples as disclosed herein. In some examples, aspects of the operations of 1415 may be performed by a message communication component 1135 as described with reference to FIG. 11.

The following provides an overview of aspects of the present disclosure:

Aspect 1: An apparatus for wireless communications at a UE, comprising: one or more memories; and one or more processors coupled with the one or more memories and configured to cause the UE to: transmit an indication of a capability of the UE to communicate in accordance with a polar multi-layer coding (MLC) multiple input multiple output (MIMO) communication scheme; receive a configuration for communication in accordance with the polar MLC MIMO communication scheme, wherein the configuration indicates a sub-block size threshold; and communicate a message in accordance with the polar MLC MIMO communication scheme based at least in part on a determination that a sub-block size for the message satisfies the sub-block size threshold.

Aspect 2: The apparatus of aspect 1, wherein the sub-block size for the message is based at least in part on a code block length associated with the message, a quantity of communication layers associated with the message, a quantity of modulation bits associated with the message, a coding rate associated with the message, or any combination thereof.

Aspect 3: The apparatus of any of aspects 1 through 2, wherein the indication of the capability of the UE to communicate in accordance with the polar MLC MIMO communication scheme comprises a sub-block size capability, wherein the sub-block size threshold is based at least in part on the sub-block size capability.

Aspect 4: The apparatus of aspect 3, wherein the configuration indicates a first configuration of a plurality of valid configurations for the polar MLC MIMO communication scheme; and respective sub-block sizes of the plurality of valid configurations each satisfy the sub-block size threshold.

Aspect 5: The apparatus of any of aspects 1 through 4, wherein the configuration indicates a quantity of layers associated with the polar MLC MIMO communication scheme, a modulation and coding scheme, or any combination thereof.

Aspect 6: The apparatus of any of aspects 1 through 5, wherein the sub-block size is less than the sub-block size threshold.

Aspect 7: The apparatus of any of aspects 1 through 6, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

Aspect 8: The apparatus of any of aspects 1 through 7, wherein the capability of the UE is associated with a UE category to which the UE belongs.

Aspect 9: The apparatus of any of aspects 1 through 8, wherein the polar MLC MIMO communication scheme comprises constellation-level MLC or layer-level MLC.

Aspect 10: An apparatus for wireless communications at a network entity, comprising: one or more memories; and one or more processors coupled with the one or more memories and configured to cause the network entity to: obtain an indication of a capability of a user equipment (UE) to communicate in accordance with a polar multi-layer coding (MLC) multiple input multiple output (MIMO) communication scheme; output a configuration for communication in accordance with the polar MLC MIMO communication scheme, wherein the configuration indicates a sub-block size threshold; and communicate a message in accordance with the polar MLC MIMO communication scheme based at least in part on a determination that a sub-block size for the message satisfies the sub-block size threshold.

Aspect 11: The apparatus of aspect 10, wherein the sub-block size for the message is based at least in part on a code block length associated with the message, a quantity of communication layers associated with the message, a quantity of modulation bits associated with the message, a coding rate associated with the message, or any combination thereof.

Aspect 12: The apparatus of any of aspects 10 through 11, wherein the indication of the capability of the UE to communicate in accordance with the polar MLC MIMO communication scheme comprises a sub-block size capability, wherein the sub-block size threshold is based at least in part on the sub-block size capability.

Aspect 13: The apparatus of aspect 12, wherein the configuration indicates a first configuration of a plurality of valid configurations for the polar MLC MIMO communication scheme; and respective sub-block sizes of the plurality of valid configurations each satisfy the sub-block size threshold.

Aspect 14: The apparatus of any of aspects 10 through 13, wherein the configuration indicates a quantity of layers associated with the polar MLC MIMO communication scheme, a modulation and coding scheme, or any combination thereof.

Aspect 15: The apparatus of any of aspects 10 through 14, wherein the sub-block size is less than the sub-block size threshold.

Aspect 16: The apparatus of any of aspects 10 through 15, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

Aspect 17: The apparatus of any of aspects 10 through 16, wherein the capability of the UE is associated with a UE category to which the UE belongs.

Aspect 18: The apparatus of any of aspects 10 through 17, wherein the polar MLC MIMO communication scheme comprises constellation-level MLC or layer-level MLC.

Aspect 19: A method for wireless communications at a UE, comprising: transmitting an indication of a capability of the UE to communicate in accordance with a polar multi-layer coding (MLC) multiple input multiple output (MIMO) communication scheme; receiving a configuration for communication in accordance with the polar MLC MIMO communication scheme, wherein the configuration indicates a sub-block size threshold; and communicating a message in accordance with the polar MLC MIMO communication scheme based at least in part on a determination that a sub-block size for the message satisfies the sub-block size threshold.

Aspect 20: The method of aspect 19, wherein the sub-block size for the message is based at least in part on a code block length associated with the message, a quantity of communication layers associated with the message, a quantity of modulation bits associated with the message, a coding rate associated with the message, or any combination thereof.

Aspect 21: The method of any of aspects 19 through 20, wherein the indication of the capability of the UE to communicate in accordance with the polar MLC MIMO communication scheme comprises a sub-block size capability, wherein the sub-block size threshold is based at least in part on the sub-block size capability.

Aspect 22: The method of aspect 21, wherein the configuration indicates a first configuration of a plurality of valid configurations for the polar MLC MIMO communication scheme; and respective sub-block sizes of the plurality of valid configurations each satisfy the sub-block size threshold.

Aspect 23: The method of any of aspects 19 through 22, wherein the configuration indicates a quantity of layers associated with the polar MLC MIMO communication scheme, a modulation and coding scheme, or any combination thereof.

Aspect 24: The method of any of aspects 19 through 23, wherein the sub-block size is less than the sub-block size threshold.

Aspect 25: The method of any of aspects 19 through 24, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

Aspect 26: The method of any of aspects 19 through 25, wherein the capability of the UE is associated with a UE category to which the UE belongs.

Aspect 27: The method of any of aspects 19 through 26, wherein the polar MLC MIMO communication scheme comprises constellation-level MLC or layer-level MLC.

Aspect 28: A method for wireless communications at a network entity, comprising: obtaining an indication of a capability of a UE to communicate in accordance with a polar multi-layer coding (MLC) multiple input multiple output (MIMO) communication scheme; outputting a configuration for communication in accordance with the polar MLC MIMO communication scheme, wherein the configuration indicates a sub-block size threshold; and communicating a message in accordance with the polar MLC MIMO communication scheme based at least in part on a determination that a sub-block size for the message satisfies the sub-block size threshold.

Aspect 29: The method of aspect 28, wherein the sub-block size for the message is based at least in part on a code block length associated with the message, a quantity of communication layers associated with the message, a quantity of modulation bits associated with the message, a coding rate associated with the message, or any combination thereof.

Aspect 30: The method of any of aspects 28 through 29, wherein the indication of the capability of the UE to communicate in accordance with the polar MLC MIMO communication scheme comprises a sub-block size capability, wherein the sub-block size threshold is based at least in part on the sub-block size capability.

Aspect 31: The method of aspect 30, wherein the configuration indicates a first configuration of a plurality of valid configurations for the polar MLC MIMO communication scheme; and respective sub-block sizes of the plurality of valid configurations each satisfy the sub-block size threshold.

Aspect 32: The method of any of aspects 28 through 31, wherein the configuration indicates a quantity of layers associated with the polar MLC MIMO communication scheme, a modulation and coding scheme, or any combination thereof.

Aspect 33: The method of any of aspects 28 through 32, wherein the sub-block size is less than the sub-block size threshold.

Aspect 34: The method of any of aspects 28 through 33, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

Aspect 35: The method of any of aspects 28 through 34, wherein the capability of the UE is associated with a UE category to which the UE belongs.

Aspect 36: The method of any of aspects 28 through 35, wherein the polar MLC MIMO communication scheme comprises constellation-level MLC or layer-level MLC.

Aspect 38: A UE for wireless communications, comprising at least one means for performing a method of any of aspects 19 through 27.

Aspect 39: A non-transitory computer-readable medium storing code for wireless communications, the code comprising instructions executable by one or more processors to perform a method of any of aspects 19 through 27.

Aspect 41: A network entity for wireless communications, comprising at least one means for performing a method of any of aspects 28 through 36.

Aspect 42: A non-transitory computer-readable medium storing code for wireless communications, the code comprising instructions executable by one or more processors to perform a method of any of aspects 28 through 36.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more memories; and
    one or more processors coupled with the one or more memories and configured to cause the UE to:
        transmit an indication of a capability of the UE to communicate in accordance with a polar multi-layer coding (MLC) multiple input multiple output (MIMO) communication scheme, wherein the indication of the capability of the UE to communicate in accordance with the polar MLC MIMO communication scheme comprises a sub-block size capability;
        receive a configuration for communication in accordance with the polar MLC MIMO communication scheme, wherein the configuration indicates a sub-block size threshold that is based at least in part on the sub-block size capability; and
        communicate a message in accordance with the polar MLC MIMO communication scheme based at least in part on a determination that a sub-block size for the message satisfies the sub-block size threshold.

2. The apparatus of claim 1, wherein the sub-block size for the message is based at least in part on a code block length associated with the message, a quantity of communication layers associated with the message, a quantity of modulation bits associated with the message, a coding rate associated with the message, or any combination thereof.

3. The apparatus of claim 1, wherein:
    the configuration indicates a first configuration of a plurality of valid configurations for the polar MLC MIMO communication scheme; and
    respective sub-block sizes of the plurality of valid configurations each satisfy the sub-block size threshold.

4. The apparatus of claim 1, wherein the configuration indicates a quantity of layers associated with the polar MLC MIMO communication scheme, a modulation and coding scheme, or any combination thereof.

5. The apparatus of claim 1, wherein the sub-block size is less than the sub-block size threshold.

6. The apparatus of claim 1, wherein the capability of the UE is associated with a UE category to which the UE belongs.

7. The apparatus of claim 1, wherein:
    the polar MLC MIMO communication scheme comprises constellation-level MLC or layer-level MLC.

8. An apparatus for wireless communications at a user equipment (UE), comprising:
    one or more memories; and
    one or more processors coupled with the one or more memories and configured to cause the UE to:
        transmit an indication of a capability of the UE to communicate in accordance with a polar multi-layer coding (MLC) multiple input multiple output (MIMO) communication scheme, wherein the polar MLC MIMO communication scheme comprises application of a plurality of polar codes to sub-blocks of a message, wherein bit indices of respective polar codes of the plurality of polar codes are associated with different combinations of bit positions associated with a modulation order and layers of a plurality of communication layers of the polar MLC MIMO communication scheme;
        receive a configuration for communication in accordance with the polar MLC MIMO communication scheme, wherein the configuration indicates a sub-block size threshold; and
        communicate the message in accordance with the polar MLC MIMO communication scheme based at least in part on a determination that a sub-block size for the message satisfies the sub-block size threshold.

9. An apparatus for wireless communications at a network entity, comprising:
    one or more memories; and
    one or more processors coupled with the one or more memories and configured to cause the network entity to:

US 12,689,417 B2

53 obtain an indication of a capability of a user equipment (UE) to communicate in accordance with a polar multi-layer coding (MLC) multiple input multiple output (MIMO) communication scheme, wherein the indication of the capability of the UE to communicate in accordance with the polar MLC MIMO communication scheme comprises a sub-block size capability;

output a configuration for communication in accordance with the polar MLC MIMO communication scheme, wherein the configuration indicates a sub-block size threshold that is based at least in part on the sub-block size capability; and communicate a message in accordance with the polar MLC MIMO communication scheme based at least in part on a determination that a sub-block size for the message satisfies the sub-block size threshold.

10. The apparatus of claim 9, wherein the sub-block size for the message is based at least in part on a code block length associated with the message, a quantity of communication layers associated with the message, a quantity of modulation bits associated with the message, a coding rate associated with the message, or any combination thereof.

11. The apparatus of claim 9, wherein:

the configuration indicates a first configuration of a plurality of valid configurations for the polar MLC MIMO communication scheme; and respective sub-block sizes of the plurality of valid configurations each satisfy the sub-block size threshold.

12. The apparatus of claim 9, wherein the configuration indicates a quantity of layers associated with the polar MLC MIMO communication scheme, a modulation and coding scheme, or any combination thereof.

13. The apparatus of claim 9, wherein the sub-block size is less than the sub-block size threshold.

14. The apparatus of claim 9, wherein the capability of the UE is associated with a UE category to which the UE belongs.

15. The apparatus of claim 9, wherein:

the polar MLC MIMO communication scheme comprises constellation-level MLC or layer-level MLC.

16. An apparatus for wireless communications at a network entity, comprising:

one or more memories; and one or more processors coupled with the one or more memories and configured to cause the network entity to:

obtain an indication of a capability of a user equipment (UE) to communicate in accordance with a polar multi-layer coding (MLC) multiple input multiple output (MIMO) communication scheme, wherein the polar MLC MIMO communication scheme comprises application of a plurality of polar codes to sub-blocks of a message, wherein bit indices of respective polar codes of the plurality of polar codes are associated with different combinations of bit positions associated with a modulation order and layers of a plurality of communication layers of the polar MLC MIMO communication scheme:

output a configuration for communication in accordance with the polar MLC MIMO communication scheme, wherein the configuration indicates a sub-block size threshold; and communicate the message in accordance with the polar MLC MIMO communication scheme based at least in part on a determination that a sub-block size for the message satisfies the sub-block size threshold.

17. A method for wireless communications at a user equipment (UE), comprising:

transmitting an indication of a capability of the UE to communicate in accordance with a polar multi-layer coding (MLC) multiple input multiple output (MIMO) communication scheme, wherein the indication of the capability of the UE to communicate in accordance with the polar MLC MIMO communication scheme comprises a sub-block size capability;

receiving a configuration for communication in accordance with the polar MLC MIMO communication scheme, wherein the configuration indicates a sub-block size threshold that is based at least in part on the sub-block size capability; and communicating a message in accordance with the polar MLC MIMO communication scheme based at least in part on a determination that a sub-block size for the message satisfies the sub-block size threshold.

18. The method of claim 17, wherein the sub-block size for the message is based at least in part on a code block length associated with the message, a quantity of communication layers associated with the message, a quantity of modulation bits associated with the message, a coding rate associated with the message, or any combination thereof.

19. The method of claim 17, wherein:

the configuration indicates a first configuration of a plurality of valid configurations for the polar MLC MIMO communication scheme; and respective sub-block sizes of the plurality of valid configurations each satisfy the sub-block size threshold.

20. The method of claim 17, wherein the configuration indicates a quantity of layers associated with the polar MLC MIMO communication scheme, a modulation and coding scheme, or any combination thereof.

21. The method of claim 17, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

22. A method for wireless communications at a network entity, comprising:

obtaining an indication of a capability of a user equipment (UE) to communicate in accordance with a polar multi-layer coding (MLC) multiple input multiple output (MIMO) communication scheme, wherein the indication of the capability of the UE to communicate in accordance with the polar MLC MIMO communication scheme comprises a sub-block size capability;

outputting a configuration for communication in accordance with the polar MLC MIMO communication scheme, wherein the configuration indicates a sub-block size threshold that is based at least in part on the sub-block size capability; and communicating a message in accordance with the polar MLC MIMO communication scheme based at least in part on a determination that a sub-block size for the message satisfies the sub-block size threshold.

23. The method of claim 22, wherein the sub-block size for the message is based at least in part on a code block length associated with the message, a quantity of communication layers associated with the message, a quantity of modulation bits associated with the message, a coding rate associated with the message, or any combination thereof.

24. The method of claim 22, wherein:

the configuration indicates a first configuration of a plurality of valid configurations for the polar MLC MIMO communication scheme; and respective sub-block sizes of the plurality of valid configurations each satisfy the sub-block size threshold.

25. The method of claim 22, wherein the configuration indicates a quantity of layers associated with the polar MLC MIMO communication scheme, a modulation and coding scheme, or any combination thereof.

26. The method of claim 22, wherein the polar MLC MIMO communication scheme comprises application of a plurality of polar codes to sub-blocks of the message, wherein bit indices of respective polar codes of the plurality of polar codes are associated with different combinations of bit positions associated with a modulation order and layers of a plurality of communication layers of the polar MLC MIMO communication scheme.

\* \* \* \* \*